May 12, 1953  B. SILVER  2,638,341
FEED ATTACHMENT FOR ALLIGATOR SHEARS
Filed Feb. 2, 1951  4 Sheets-Sheet 2
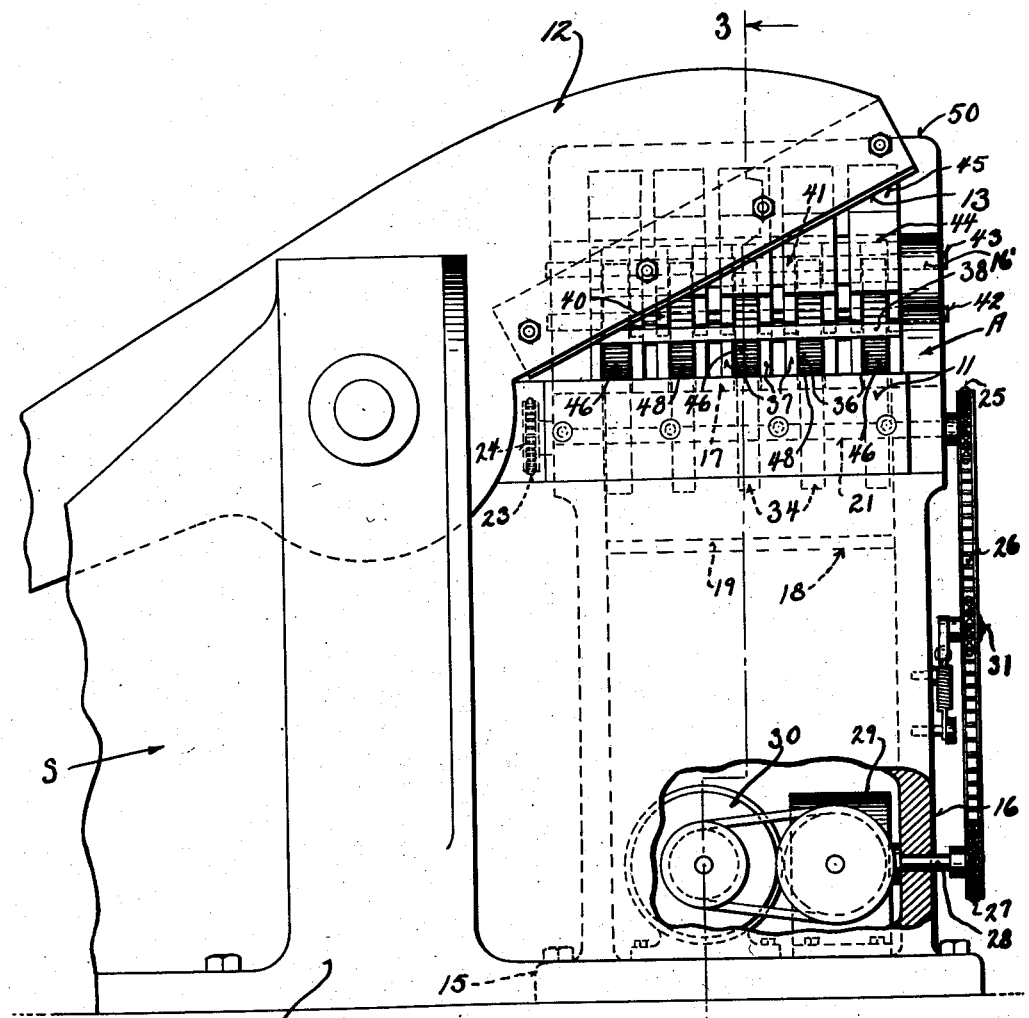
Fig.2.
Fig.8.
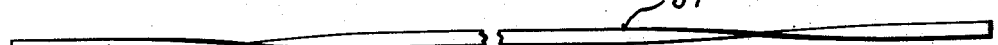
INVENTOR
BARNEY SILVER
BY Young & Wright
ATTORNEYS

INVENTOR
BARNEY SILVER

ATTORNEYS

May 12, 1953  B. SILVER  2,638,341
FEED ATTACHMENT FOR ALLIGATOR SHEARS
Filed Feb. 2, 1951  4 Sheets-Sheet 4
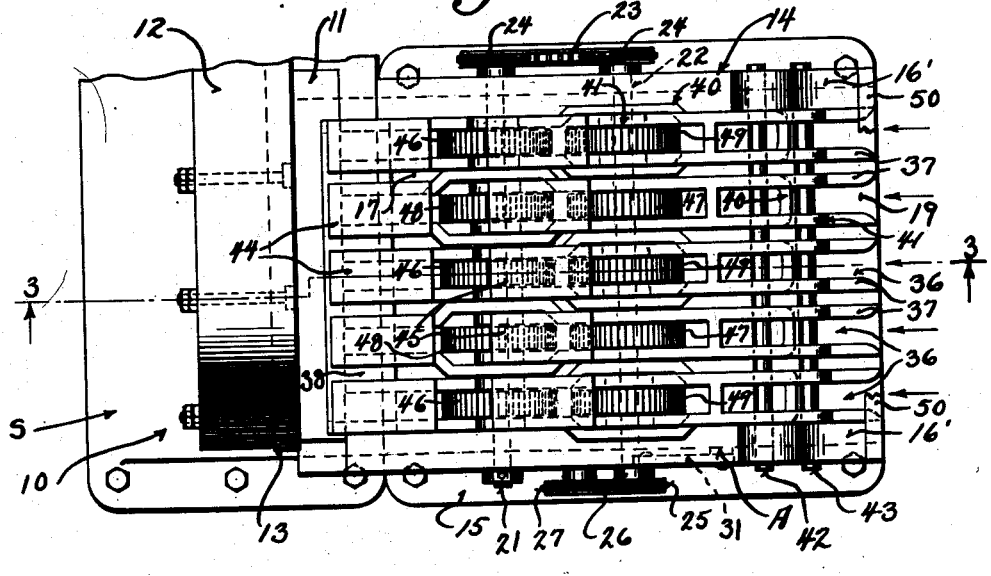
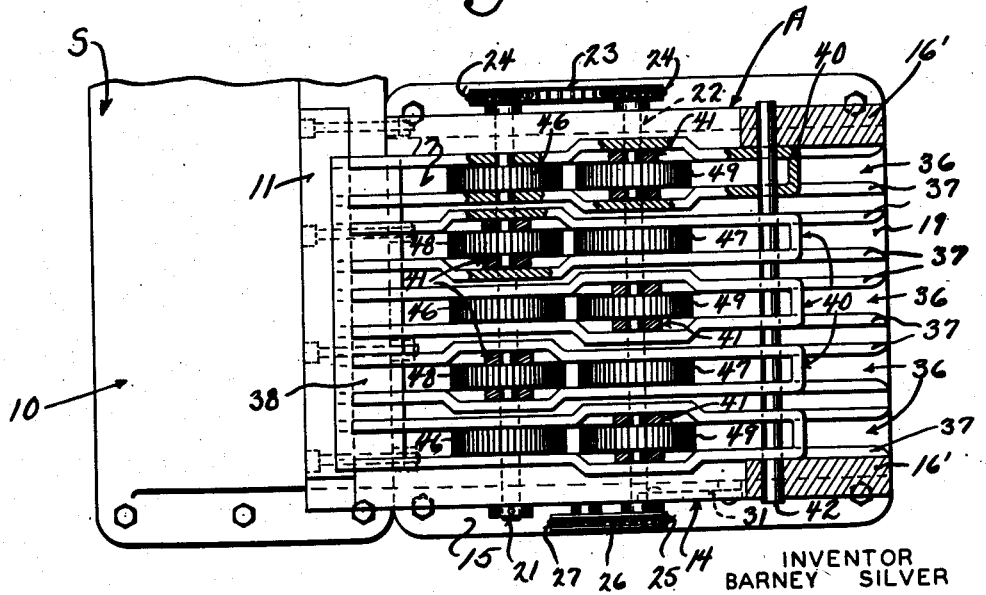
INVENTOR
BARNEY SILVER
BY
ATTORNEYS Patented May 12, 1953

2,638,341

UNITED STATES PATENT OFFICE 2,638,341

FEED ATTACHMENT FOR ALLIGATOR SHEARS

Barney Silver, Racine, Wis.

Application February 2, 1951, Serial No. 209,106

3 Claims. (Cl. 271—2.3)

This invention appertains to the feeding and guiding of elongated strips or ribbons of material to a cutting device, whereby said strips can be safely and quickly cut into short lengths.

In the handling and processing of steel plates, in certain industries, the longitudinal edges of the plates are trimmed, leaving elongated, narrow strips as waste material. These strips are cut in short lengths for ease in handling and are returned to the furnaces for reworking. Although these strips are approximately a quarter of an inch thick, the same twist and curl rendering the strips difficult to handle and feed to the shears.

As far as I am aware, it has been customary to feed one strip at a time to the power driven alligator shears, and the operator tries to straighten out these strips during the feeding process. This is not only a time consuming operation, but danger to the operator and bystanders is always present, as the shears tend to throw the pieces as the same are cut, particularly the remaining short length.

It is, therefore, one of the primary objects of my invention, to provide a novel device for effectively feeding and straightening out a plurality of strips to be cut, to a pair of alligator or like power driven cutting shears.

Another important object of my invention is the provision of an attachment for alligator or like shears embodying a feed table having parallel rows of power driven feed wheels in conjunction with a plurality of weighted levers extending above the table carrying idle feed wheels so that strips of material can be fed into the table along the length of the shear knives, so that on each stroke of the cutting knife, short lengths will be cut off of a plurality of strips.

A further salient object of the invention is the provision of means for independently mounting the levers and upper feed rollers relative to one another and to the bottom feed wheels, so that said upper feed wheels can independently move relative to the configuration of different strips or ribbons, as the same are being fed into the machine.

A still further object of my invention is the provision of novel means for forming and arranging the various levers or arms carrying the upper feed wheels, so that a maximum number of feed wheels can be provided in a limited space, and in proper longitudinal alignment.

A still further object of my invention is to provide a novel strip feeder of the above character, which will be durable and efficient in use, one that will be comparatively inexpensive to manufacture and one which can be readily associated with power operated alligator shears of a type commonly found in the open market.

With these and other objects in view, the invention consists in the novel construction, arrangement and formation of parts, as will be hereinafter more specifically described and claimed, and illustrated in the accompanying drawings, in which drawings, Figure 1 is a side elevational view of my novel strip feeder and straightener associated with a pair of alligator shears.

Figure 2 is a front elevational view showing the strip feeder and straightener associated with the shears, parts of the view being shown broken away and in section to illustrate structural features.

Figure 4 is a top plan view of the attachment associated with the alligator shears, only a part of the shears being shown.

Figure 5 is a horizontal sectional view taken on the line 5—5 of Figure 1, looking in the direction of the arrows illustrating the novel arrangement of the pivoted levers on arms and feed wheels.

Figure 6 is a detail transverse sectional view taken through the attachment on the line 6—6 of Figure 3, looking in the direction of the arrows.

Figure 8 is a top plan view illustrating one of the strips to be straightened and cut.

Referring to the drawings in detail, wherein similar reference characters designate corresponding parts throughout the several views, the letter A generally indicates my novel attachment for feeding and straightening a plurality of metal strips to a pair of power operated alligator shears S.

Figure 1:
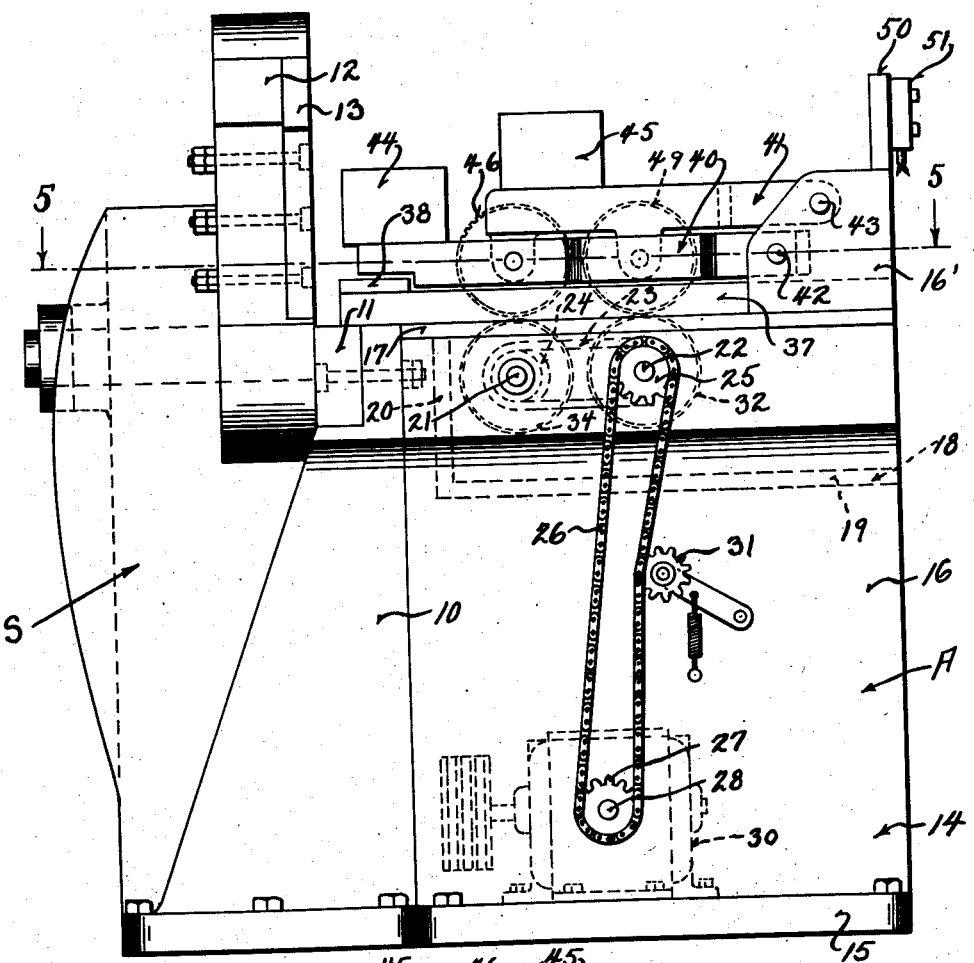

The alligator shears S, per se, form no part of the present invention, and are of a type now in common use and hence these shears will not be described in detail. However, the shears S embody a heavy brace frame 10 having secured thereto, the lower rigid cutting blade 11. Rockably mounted upon the frame 10, is the movable jaw 12 and this jaw has secured thereto the upper cutting shear blade 13. The jaw 12 is operated toward and away from the lower stationary blade 11 through suitable mechanism (not shown). In ordinary practice material to be cut is fed by hand between the blades 11 and 13.

My novel attachment A is connected with the base 10 of the shears S at one side of the blades 11 and 13, and functions, as will now be described to automatically feed and straighten material to and between the cutting blades 11 and 13. The attachment A also includes a rugged frame 14, which may be built up in any desired way, but as illustrated, the same includes a base plate 15 having secured thereto or formed thereon, upright spaced parallel side wall plates 16. Rigidly secured to the upper ends of the side wall plates 16 is a flat, smooth feed table 17. When the attachment A is placed in proper position relative to the shears, the table 17 lies in the same horizontal plane as the upper surface of the knife 11, so that the strips will ride directly off of the table over said knife. The frame 14, is further braced at its upper end by a housing 18, and this housing includes a bottom wall 19 and a front transversely extending wall 20. The walls 19 and 20 are welded or otherwise rigidly secured to the side frame plate 16. The housing 18 forms a protection and guard for certain operating parts of the strip feeder and straightener, as will be later set forth.

The means for feeding and straightening the strips includes a pair of spaced parallel transversely extending shafts 21 and 22, and these shafts are journaled in the upper ends of the frame plates 16 directly below the table 17. Suitable bearings can be carried by the frame plates 16 for said shafts, if such should be desired. The shafts are connected together for synchronous movement in the same direction by means of a sprocket chain 23, which is trained about sprocket wheels 24, keyed, or otherwise secured to the shafts 21 and 22. One of the shafts, namely shaft 22, has also keyed or otherwise secured thereto, a drive sprocket wheel 25 over which is trained a drive sprocket chain 26, and this chain is also trained about a sprocket wheel 27, secured to a drive shaft 28, extending out of a speed reducing transmission 29. The speed reducing transmission is driven from an electric motor 30, mounted upon the base plate 15. A chain tightener 31 of any preferred character can be utilized for the sprocket chain 26 to take up slack therein. The shaft 22 is located below and a short distance in advance of the front edge of the feed table 17, and this shaft has keyed, or otherwise secured thereto, a series of equidistantly spaced toothed front feed wheels 32. The front edge of the table 17 is slotted as at 33, to receive the wheels and the peripheries of these toothed wheels extend a slight distance above the upper surface of the table. The shaft 21 has secured thereto like series of toothed rear feed wheels 34 and the table 17 is provided with equidistantly spaced slots 35 for receiving the feed wheels 34 and the peripheries of these wheels also extend a slight distance above the upper surface of the table 17.

Figure 3:
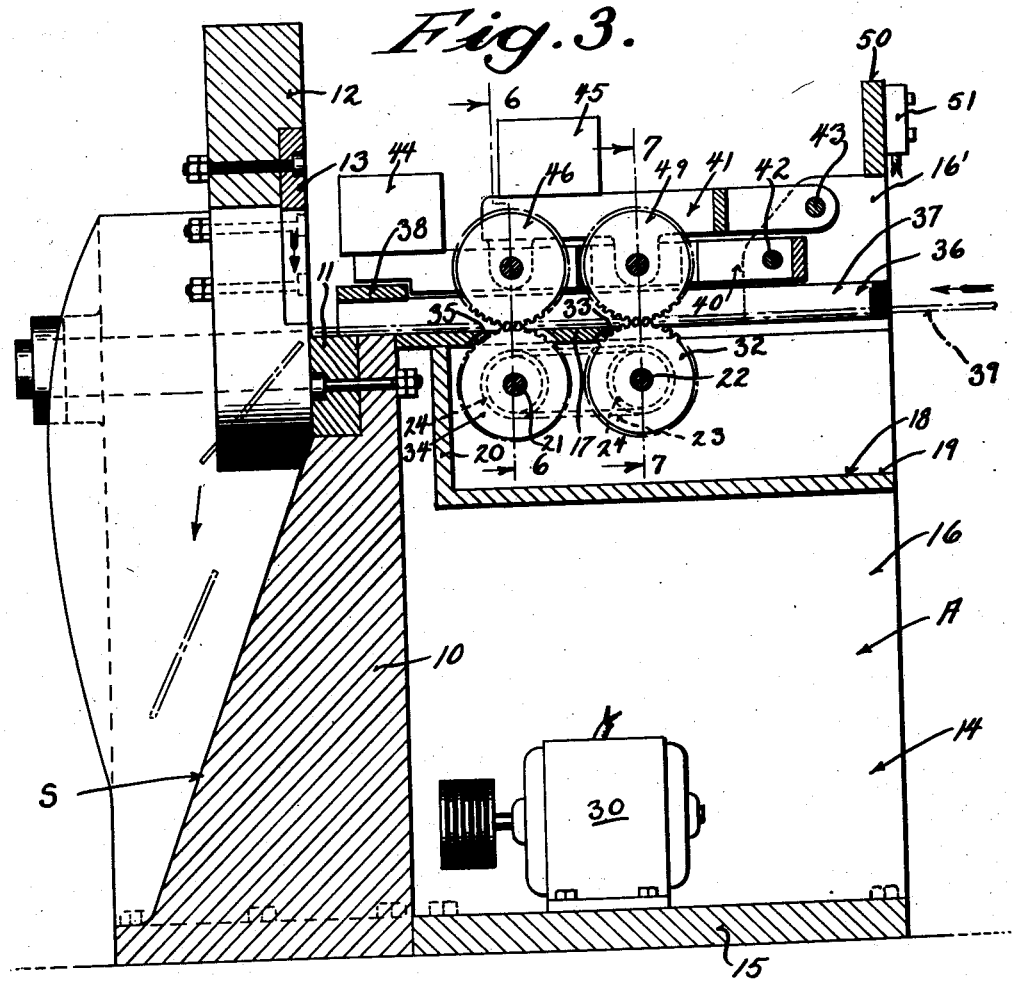
Figure 3 is a vertical, longitudinal sectional view taken on the line 3—3 of Figure 2, looking in the direction of the arrows.
Figure 7:
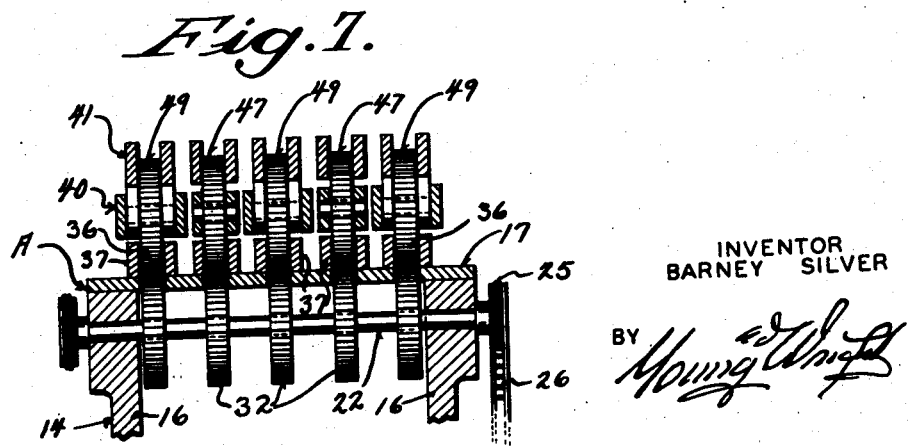
Figure 7 is a view similar to Figure 6, but taken on the line 7—7 of Figure 3, looking in the direction of the arrows.

Longitudinally extending guide channels 36 are provided for directing the passage of the elongated strips through the machine, and to the feed wheels 32 and 34. These guide channels are preferably formed by a plurality of pairs of equidistantly spaced guide rails 37, and these guide rails extend over and are rigidly secured to the upper surface of the table 17. It is to be also noted, that the rails 37 extend forwardly of the table and over the upper surface of the frame 10 and partially over the knife 11. If desired, the rails can be welded, or otherwise secured to the frame 10 of the shears. The upper edges of the rails 37 at this point are connected by a transversely extending top plate 38, as best shown in Figures 1 and 3. The rollers 32 and 34 lie in the guide channels 36 between the rails 37.

The channels 36 are of a width which is slightly greater than the widths of the strips to be fed into the attachment A toward the shears S, and in Figure 8, I have illustrated a metal strip or ribbon 39. In this figure, it can be seen that the strip or ribbon 39 tends to twist or curl and that means must be provided for not only feeding the strips through the machine but for also straightening the strips, and it is essential that the strips be held down on the table 17 substantially parallel therewith. Consequently, I provide means in conjunction with the toothed feed wheels 32 and 34 for this purpose.

The means for holding down and feeding and straightening the strips includes a series of lower arms 40 and a series of upper arms 41. The arms 40 are rockably mounted for independent movement upon a cross shaft 42 arranged at the front of the attachment above the guide channels and forwardly of the feed wheels 32. The upper arms 41 are mounted for rocking movement on a like cross shaft 43, and this shaft can be arranged slightly forward of the shaft 42. The shafts 42 and 43 can be rigidly secured to bracket plates 16' carried by the frame 14. The arms 40 and 41 are of like construction, but the lower set of arms 40, is preferably of a greater length than the upper set of arms 41. As illustrated, each arm of the lower set of arms 40, includes a U-shaped frame in top plan, and the forward end of each arm carries a weight 44 of sufficient mass for holding the arm down in proper position. Each arm of the upper set of arms 41 also includes side frame plates, and each arm carries a weight 45 of sufficient mass for holding the arm down in proper position. The upper set of arms 41 is directly above the lower set of arms and is in longitudinal alignment therewith. Alternate arms of the lower set of arms 40 carry upper front toothed hold down wheels 46 and the other arms of this set carry upper inner hold down toothed wheels 47. Alternate arms of the upper set of arms 41 carry upper front hold down toothed wheels 48 and the other arms of this set carry upper outer hold down toothed wheels 49. The arms of the lower set which carry the front wheels 46, have their side plates spread forwardly of the wheels 46, so as to receive therebetween the toothed outer wheels 49. The arms of the lower set of arms 40, which carry the outer toothed wheels 47 have their side plates spread outwardly in front of the wheels 47 so as to receive the toothed wheels 48 carried by the alternate arms of the upper set 41. By this construction and arrangement, it can be seen that alternate arms of the lower and top sets of arms 40 and 41 carry upper inner and outer wheels which can move up and down independently of one another, and that these wheels are arranged in the channels 36 directly above the front and rear feed wheels 32 and 34 respectively. In use of the attachment, an operator stands in front thereof and a pile of the strips 39 is placed adjacent to and at one side of the machine within easy reach of the operator. It is preferred to have means at the front of the attachment so that the operator can control the motor 30, and hence a switch panel 50 can be carried by one of the bracket plates 16' and this panel has connected therewith a switch 51 for opening and closing a circuit to said motor. Upon the starting of the attachment, the operator reaches down to the pile of strips 39 and picks up a strip and places the same between the rails 37 of a selected channel 36, and moves the same forwardly until the strip is grasped by a feed wheel 32 and an adjacent wheel 47 or 49, as the case may be, and thereafter this strip will be automatically drawn in by the attachment and fed toward the cutting shears. These wheels tend to straighten out the strip and when the strip reaches a wheel 34 and a wheel 46 or 48, as the case may be, the strip will be further flattened and held down on the table and fed toward the shears. Hence, each strip is engaged and held at two spaced points, and as the wheels 46, 47 and 48 and 49 have independent movement, the arms of each set of arms 40 and 41 will lie substantially in parallelism with the table at all times. As soon as a strip is gripped by the wheels, the operator can immediately feed another strip into another selected channel and this operation is continued. The strips are continuously moved forward on each up stroke of the jaw 12, and on each down stroke of the jaw 12 the knives will effectively sever a short length of material from each strip.

From the foregoing description, it can be seen that a rugged attachment has been provided for alligator shears which will effectively and continuously feed elongated strips of material to the same. As the operator is spaced a considerable distance from the shears, likelihood of the operator becoming injured is decidedly lessened.

Changes in details may be made without departing from the spirit or the scope of this invention, but what I claim as new is:

1. A machine for straightening and feeding elongated strips of material comprising a supporting frame, a feed table secured to said frame, said table having spaced parallel longitudinally extending guide channels for the strips, and each of said channels including spaced parallel guide plates extending over and forwardly of the table, front and rear power driven toothed wheels below said table arranged in each channel between the guide rails and having their peripheries projecting slightly above the upper surface of the table, a lower pivoted arm above said table carried by the supporting frame for each channel, an upper pivoted arm carried by the frame for each channel, weights for each arm for holding the arms down toward the table, and an upper rotatable idle toothed wheel carried by each arm, one of said upper wheels being arranged in front of the other, said upper wheels carried by said arms being directly above and in alignment with the front and rear power driven wheels, whereby strips of material fed into the channels will be grasped by the respective upper and power driven wheels at two spaced points.

2. A machine for straightening and feeding elongated strips of material comprising a frame, a feed table carried by the frame, a series of equidistantly spaced longitudinally extending guide channels carried by the table, front and rear feed wheels arranged in each channel below the surface of said table and having their peripheries protruding a slight distance above the upper surface of the feed table for engaging the strips, a lower pivoted arm carried by the frame for each channel above said front and rear feed wheel, an upper pivoted arm carried by the frame for each channel and arranged directly above the lower arm, a weight for each one of said arms to hold the same down, an upper wheel rotatably carried by each one of the arms for independent movement, one of the said upper wheels being arranged in advance of the other and both of the said upper wheels being directly above and in alignment with the said front and rear feed wheels, and each of said channels including spaced parallel guide rails extending above the table and forwardly beyond the table.

3. A machine for straightening and feeding elongated strips of material comprising a frame, a feed table carried by the frame, a series of equidistantly spaced longitudinally extending guide channels carried by the table, front and rear feed wheels arranged in each channel below said feed table and having their peripheries protruding a slight distance above the upper surface of the feed table for engaging the strips, a lower pivoted arm carried by the frame for each channel, an upper pivoted arm carried by the frame for each channel and arranged directly above the lower arm, said upper and lower arms being arranged above said front and rear feed wheels and each arm having its respective pivot point rearward of said rear feed wheel, a weight for each one of said arms to hold the same down and an upper wheel rotatably carried by each one of the arms for independent movement, one of the said upper wheels being arranged in advance of the other and both of said upper wheels being directly above and in alignment with the feed front and rear wheels respectively, each of said arms including open frames having side plates, the side plates of the lower arms being spread to receive therebetween the respective upper wheels carried by the upper arms.

BARNEY SILVER.

References Cited in the file of this patent

UNITED STATES PATENTS

| Number | Name | Date |
|---|---|---|
| 524,501 | Kendall | Aug. 14, 1894 |
| 916,562 | Knobel | Mar. 30, 1909 |
| 995,465 | Jaegle | June 20, 1911 |
| 1,637,658 | Rose | Aug. 2, 1927 |
| 1,689,110 | Brust | Oct. 23, 1928 |
| 1,702,185 | Weber | May 3, 1930 |
| 1,764,831 | Fancher et al. | June 17, 1930 |
| 1,798,316 | Driesbach | Mar. 31, 1931 |
| 2,275,064 | Moore | Mar. 3, 1942 |
| 2,365,288 | Pask | Dec. 19, 1944 |

FOREIGN PATENTS

| Number | Country | Date |
|---|---|---|
| 496,822 | Germany | May 3, 1930 |